(12) United States Patent
Yoshikawa

(10) Patent No.: US 8,064,075 B2
(45) Date of Patent: Nov. 22, 2011

(54) IMAGE PROCESSING APPARATUS, COUNT MANAGEMENT SERVER, AND COUNT MANAGEMENT METHOD

(75) Inventor: Takashi Yoshikawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1180 days.

(21) Appl. No.: 11/798,388

(22) Filed: May 14, 2007

(65) Prior Publication Data

US 2007/0273916 A1    Nov. 29, 2007

(30) Foreign Application Priority Data

May 15, 2006   (JP) .................................. 2006-135339

(51) Int. Cl.
G06F 15/00 (2006.01)
G06F 15/16 (2006.01)
(52) U.S. Cl. ...................................... 358/1.14; 709/204
(58) Field of Classification Search ................ 358/1.14, 358/1.15, 1.13, 1.16, 1.18; 709/229, 204, 709/225, 226, 217, 206, 219; 726/5, 6, 7, 726/3, 19; 455/517, 561, 566
See application file for complete search history.

(56) References Cited

U.S. PATENT DOCUMENTS

| | | | |
|---|---|---|---|
| 2005/0275867 A1 * | 12/2005 | Higashiura et al. | ......... 358/1.14 |
| 2006/0221388 A1 | 10/2006 | Yoshikawa et al. | |

FOREIGN PATENT DOCUMENTS

| | | |
|---|---|---|
| JP | 2001-312380 | 11/2001 |
| JP | 2002-108587 | 4/2002 |
| JP | 2003-196046 | 7/2003 |
| JP | 2003-280879 | 10/2003 |
| JP | 2003-330686 | 11/2003 |
| JP | 2004-102356 | 4/2004 |
| JP | 2004-178249 | 6/2004 |
| JP | 2005-100111 | 4/2005 |

* cited by examiner

*Primary Examiner* — Saeid Ebrahimi Dehkordy
(74) *Attorney, Agent, or Firm* — Harness, Dickey & Pierce, P.L.C.

(57) ABSTRACT

An image processing apparatus for executing a process based on a count available for each group is disclosed, including: a remaining count acquisition part acquiring a remaining count available for a group to which a user authenticated by a user ID belongs, from a count management server which manages the count for each group.

16 Claims, 14 Drawing Sheets

FIG.14

20b REGISTRATION JOB TABLE

| REGISTRATION JOB ID | GROUP ID | ... | IP ADDRESS |
|---|---|---|---|
| ... | ... | | ... |
| 00102 | 10030 | | 11.22.33.44 |
| 00103 | 10055 | | 11.22.33.55 |
| 00104 | 10030 | | 11.22.33.66 |
| ... | ... | | ... |

IMAGE PROCESSING APPARATUS, COUNT MANAGEMENT SERVER, AND COUNT MANAGEMENT METHOD

BACKGROUND OF THE INVENTION

1. Field of the Invention

The present invention generally relates to an image processing apparatus for conducting a process in response to a count managed in a count management server, the count management server for managing the count allowing each group to use the image processing apparatus, and a count management method conducted by the count management server.

2. Description of the Related Art

Conventionally, for example, in an enterprise, when the number of limited sheets to be printed out is registered for each user and the number of sheets being printed out exceeds the number of limited sheets to be printed out, it is prohibited to perform a print process (for example, refer to Japanese Laid-Open Patent Application No. 2002-108587).

Moreover, a copier installed in a convenience store or a like allows a user to copy within sheets available for an amount of money dropped in a coin box or recorded to a prepaid card.

However, since the above-described conventional technologies limits the number of sheets available for each user, it is difficult to manage the count corresponding to a user authentication of each user in a case in which each group includes a plurality of users and a count for using the image processing apparatus is given to each group.

If users in the same group are authenticated by using the same group ID, it is possible to manage the count for each group. However, if one user authenticates by using a group ID to use the image processing apparatus, another user cannot authenticate and use the image processing apparatus from another image process apparatus by using the same group ID.

In a case of using the image processing apparatus based on the user authentication for each user, it is required to divide the count assigned to one group for the plurality of users and manage each divided count corresponding to respective user. In this case, even in a case in which the count assigned to the group remains sufficiently, if the divided count for a certain user is spent, this user cannot user the image processing apparatus.

SUMMARY OF THE INVENTION

Embodiments of the present invention solve or reduce one or more of the above problems.

In order to solve or reduce one or more of the above problems, as one of embodiments, an image processing apparatus for executing a process based on a count available for each group may include a remaining count acquisition part acquiring a remaining count available for a group to which a user authenticated by a user ID belongs, from a count management server which manages the count for each group.

In the image handling apparatus, it is possible to execute a process based on the remaining count available for the group to which the user authenticated by the user ID belongs to.

According to the present invention, in a case of managing a plurality of users as members in each group and giving a count to use a predetermined process of an image processing apparatus for each group, even if more than two users in the same group request the predetermined process at different image processing apparatuses, it is possible to timely manage the count and it is possible for the plurality of users in the same group to execute the predetermined process.

BRIEF DESCRIPTION OF THE DRAWINGS

In the following, embodiments of the present invention will be described with reference to the accompanying drawings.

FIG. 14 is a diagram showing a registration job table according to the embodiment of the present invention.

DESCRIPTION OF THE PREFERRED EMBODIMENT

In the following, an embodiment of the present invention will be described with reference to the accompanying drawings.

Figure 1:
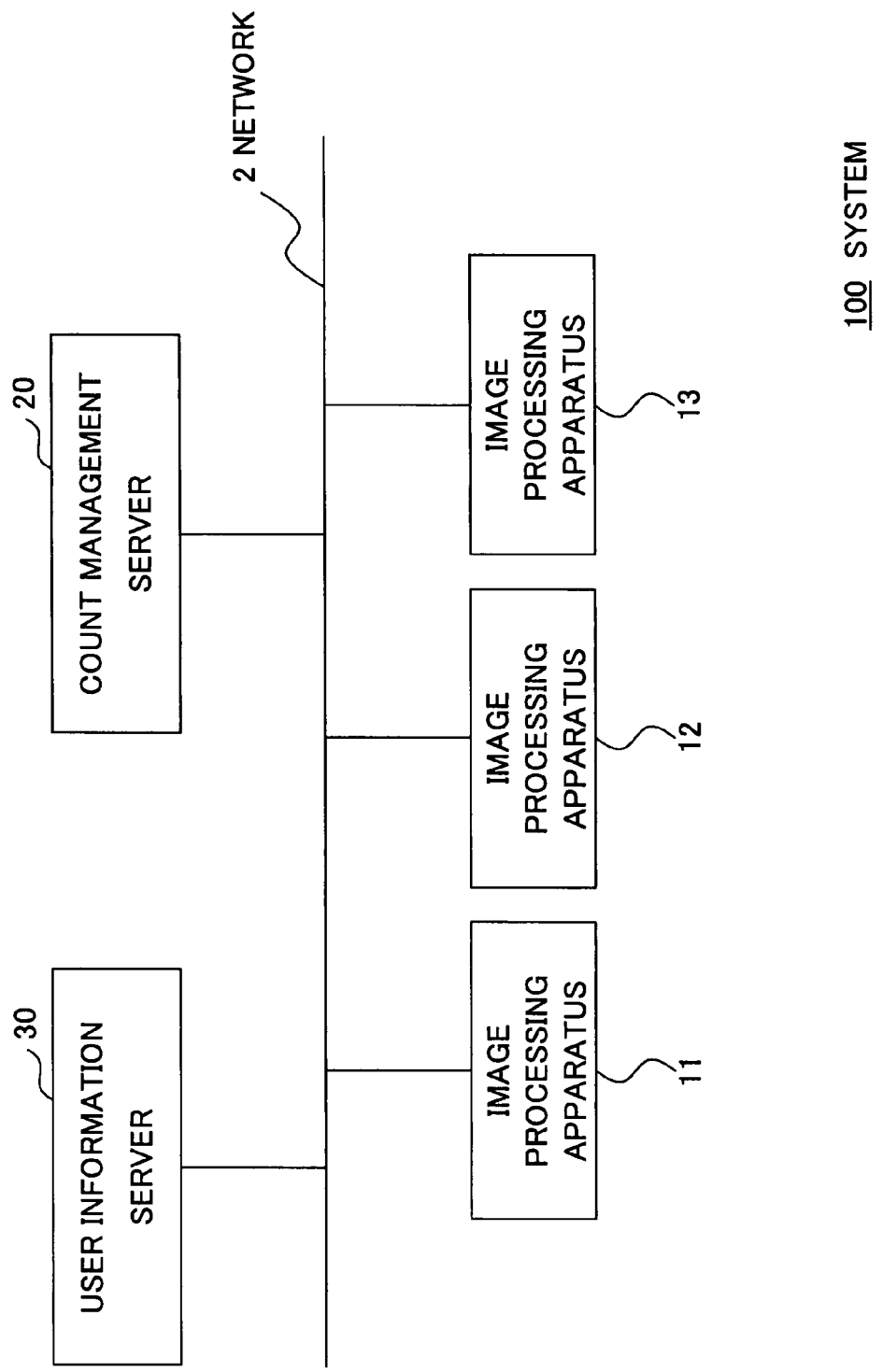
FIG. 1 is a diagram showing a system configuration according to an embodiment of the present invention.

FIG. 1 is a diagram showing a system configuration according to an embodiment of the present invention. A system 100 shown in FIG. 1 includes an image processing apparatus 11, an image processing apparatus 12, an image processing apparatus 13, a count management server 20, and a user information server 30, which can communicate to each other through a network 2.

The count management server 20 manages the number of sheets processed by whole a plurality of image processing apparatuses 11, 12, and 13 by a group unit for a plurality of users.

The user information server 30 is a server for managing user information concerning a user such as a user ID and a password, and conducts a user authentication for a user who uses the image processing apparatus 11, the image processing apparatus 12, and the image processing apparatus 13 by using the user information.

Each of the image processing apparatus 11, the image processing apparatus 12, and the image processing apparatus 13 includes a plurality of image forming functions such as a copy, a printer, a facsimile, and a like, and conducts a process based on the count indicating the number of sheets available to be printed out, which is acquired from the count management server 20. In this embodiment, an image processing apparatus is exemplified but it is not limited to the image processing apparatus and a regular printer may be applied.

For example, the count indicates the number of sheets available to use for an image formation by executing a copy function, a print function, a facsimile function, and a like.

Figure 2:
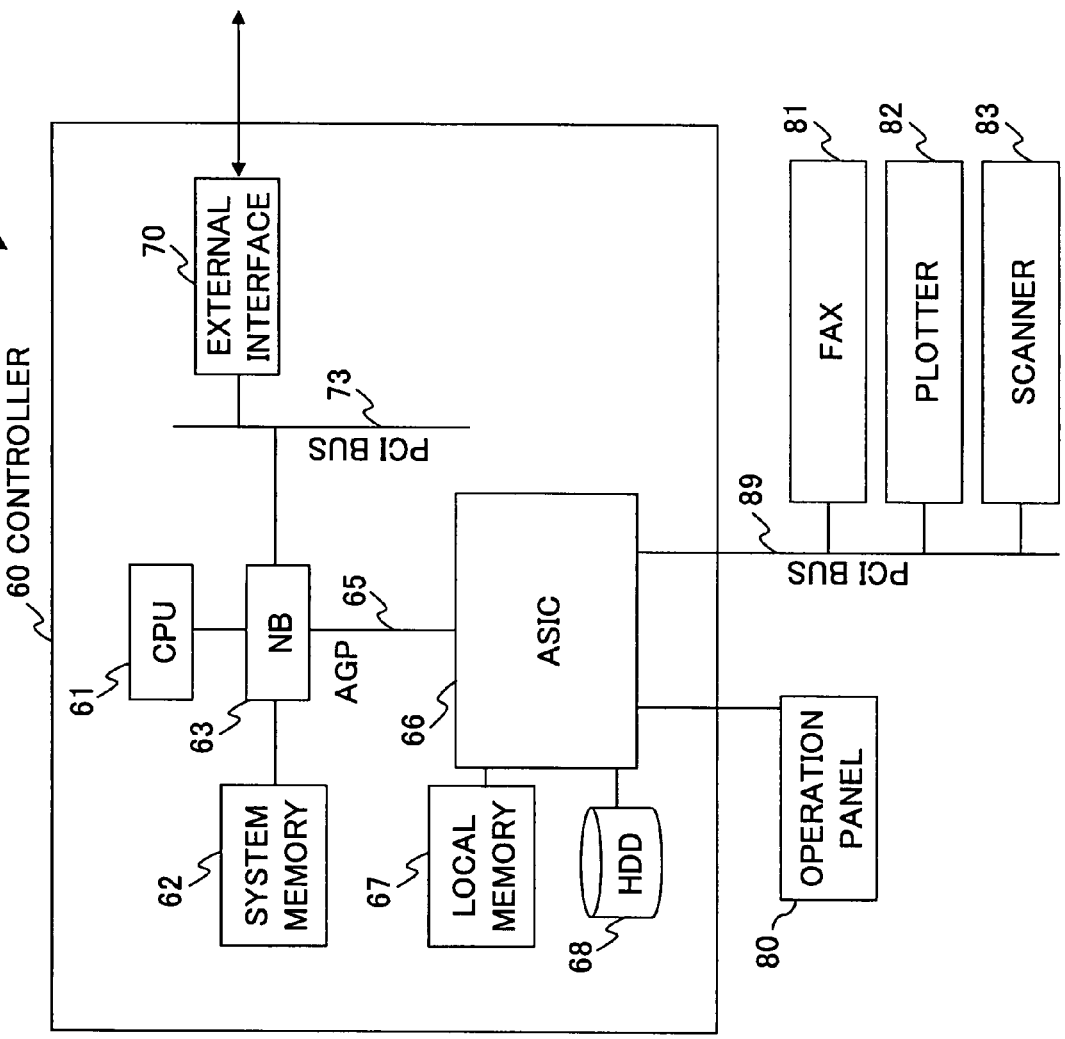
FIG. 2 is a block diagram showing a hardware configuration of each of image processing apparatuses according to the embodiment of the present invention.
Figure 3:
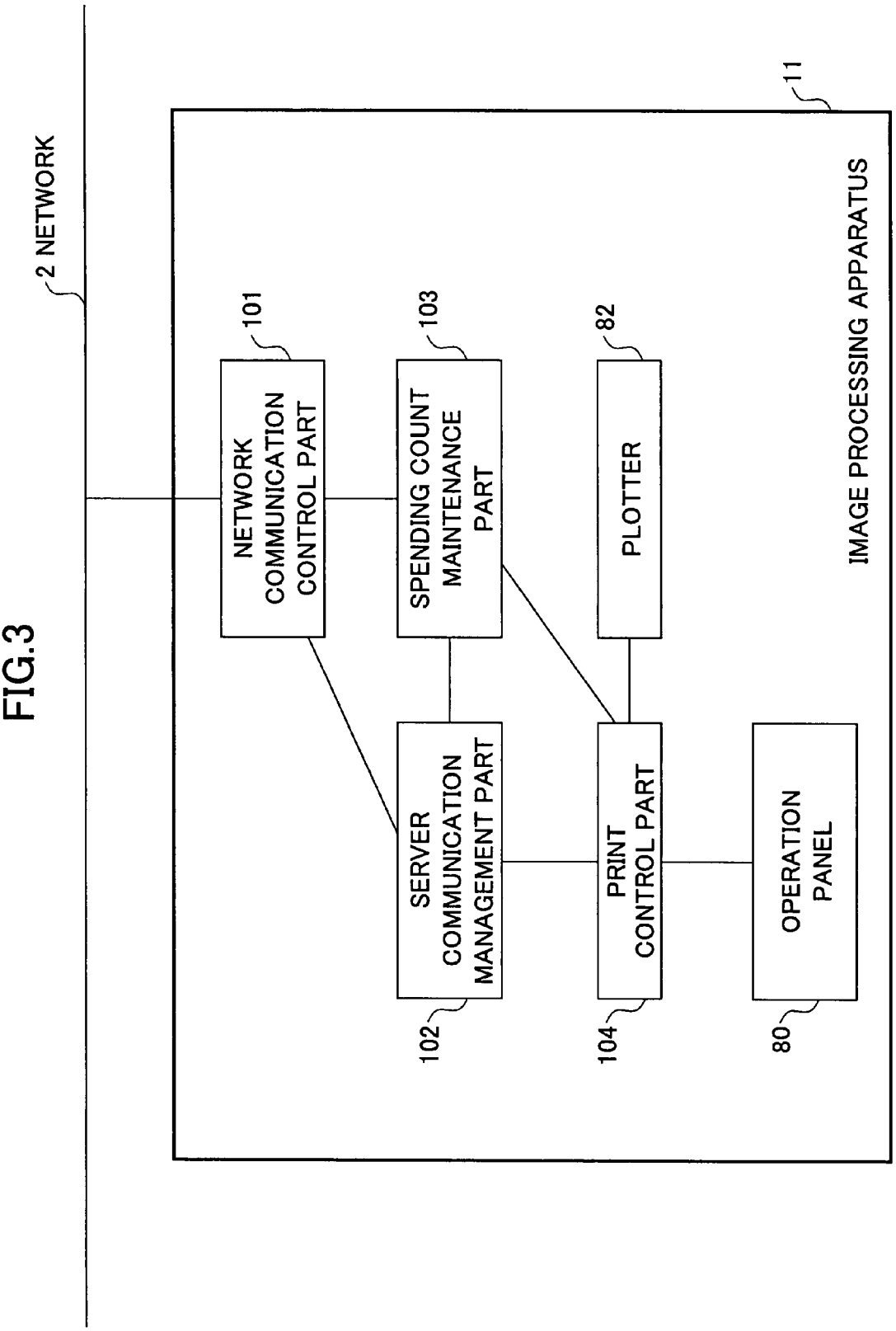
FIG. 3 is a block diagram showing a functional configuration of each of the image processing apparatuses according to the embodiment of the present invention.

For example, each of the image processing apparatuses 11 through 13 has a hardware configuration as shown in FIG. 2 and a functional configuration as shown in FIG. 3.

FIG. 2 is a block diagram showing the hardware configuration of each of the image processing apparatuses 11 through 13 according to the embodiment of the present invention. In FIG. 2, the image processing apparatus 11 includes a controller 60, an operation panel 80, a FAX 81, a plotter 82, and scanner 83.

The controller 60 includes a CPU (Central Processing Unit) 61, a system memory 62, an NB (North Bridge) 63, an ASIC (Application Specific Integrated Circuit) 66, a local memory 67, an HDD (Hard Disk Device) 68, and an external interface 70.

The operation panel 80 is connected to the ASIC 66 of the controller 60. Also, the FAX 81, the plotter 82, and the scanner 83 are connected to the ASIC 66 of the controller 60 through a PCI (Peripheral Component Interconnect) bus 89.

In the controller 60, the local memory 67, the HDD 68, and the like are connected to the ASIC 66, and the CPU 61 and the ASIC 66 are connected to each other through the NB 63 of a CPU chipset. In addition, the ASIC 66 and the NB 63 are connected to each other through an AGP (Accelerated Graphics Port) 65.

The CPU 61 controls the entire image processing apparatus 11. The NB 63 is a bridge for connecting the CPU 61 to the system memory 62, the ASIC 66, and the external interface 70. The NB 63 is connected to the external interface 70 through a PCI bus 73.

The system memory 62 is a memory used as a drawing memory or a like for an image. The local memory 67 is a memory used as an image buffer for a copy, a coding buffer, and a like. The ASIC 66 is an IC (Integrated Circuit) for an image process, which includes hardware devices for the image process. In addition, the HDD 68 is one example of a storage (auxiliary storage unit) to accumulate image data, document data, programs, font data, forms, and a like.

The external interface 70 is an interface device for connecting to the Internet or a network such as a LAN (Local Area Network). The operation panel 80 is an operation part for receiving an input operation from a user and displaying information for the user.

The image processing apparatuses 12 and 13 have the same hardware configuration as described above.

FIG. 3 is a block diagram showing the functional configuration of each of the image processing apparatuses 11 through 13 according to the embodiment of the present invention. In FIG. 3, the image processing apparatus 11 includes a network communication control part 101 for controlling communications to other apparatuses 12 and 13, the count management server 20, and the user information server 30 through the network 2, a server communication management part 102 for managing a communication to the count management server 20, a spending count maintenance part 103 for storing a count available in each groups, and a print control part 104 for controlling the plotter 82 to form an image on a predetermined medium, displaying information concerning a print at the operation panel 80, and receiving an input of the user.

The server communication management part 102 manages a timing of informing a spent count to the count management server 20 and a job ID registered by the print control part 104. For example, as the timing of informing the spent count to the count management server 20, a constant time interval or a predetermined count quantity to inform when spent (hereinafter, a constant spent-count interval) is set beforehand. The constant spent-count interval indicating the constant time interval or the predetermined count quantity may be given from the count management server 20.

The spending count maintenance part 103 receives an available count which is sent from the count management server 20 and corresponds to the group ID of the group to which users belongs in which the group ID is informed from the user information server 30 in response to the user authentication, and stores the group ID and the available count in a predetermined storage area.

The count managed in the count management server 20 and the image processing apparatuses 11 through 13 may be represented by a term corresponding to a process which a user requests. For example, in a case of displaying at the operation panel 80, the count may be represented by a "sheet count" or the "number of sheets".

Each of the image processing apparatuses 12 and 13 has the same functional configuration as described above.

Figure 4:
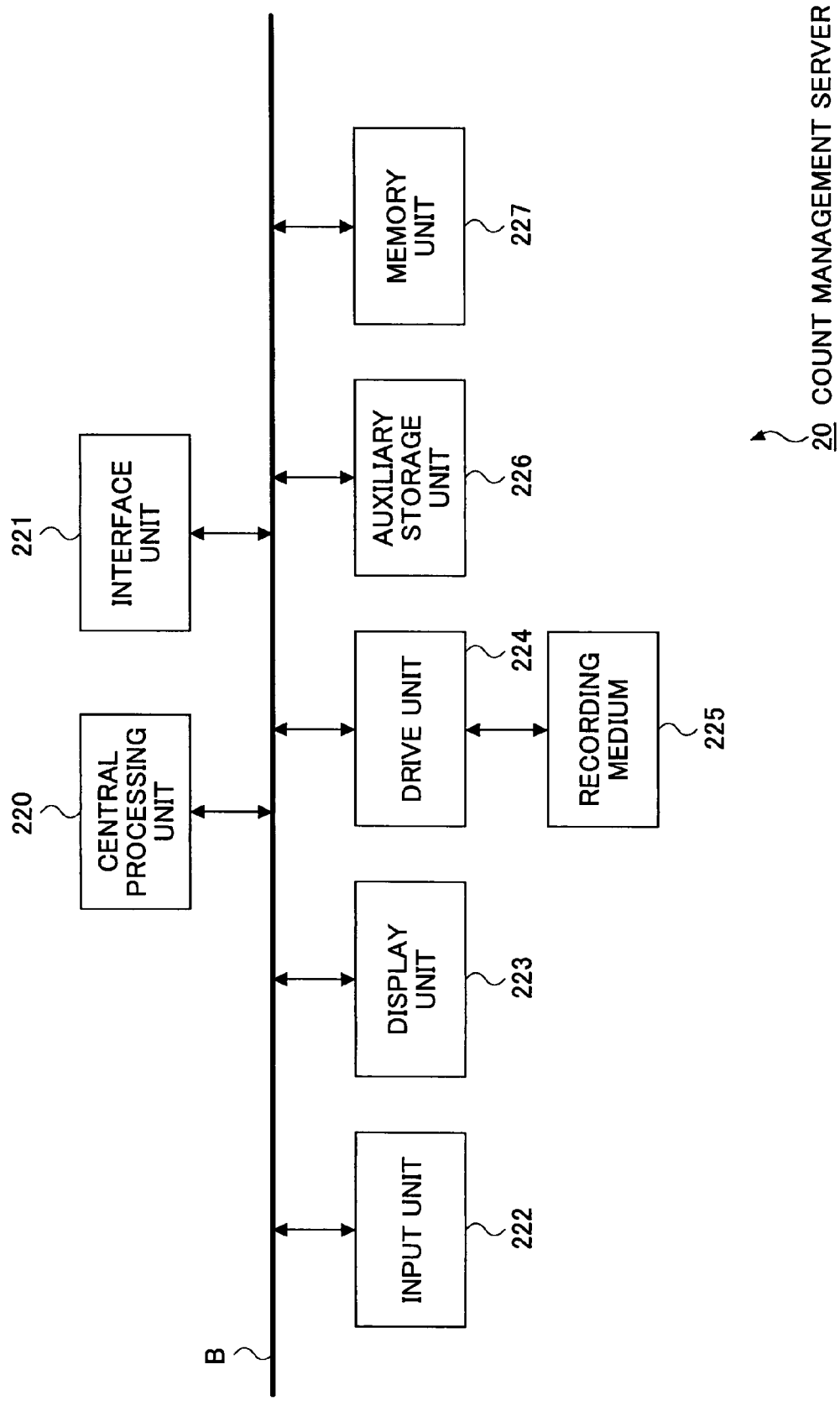
FIG. 4 is a block diagram showing a count management server according to the embodiment of the present invention.

FIG. 4 is a block diagram showing the count management server 20 according to the embodiment of the present invention. In FIG. 4, the count management server 20 is a computer apparatus, and includes a central processing unit 220, an interface unit 221, an input unit 222, a display unit 223, a drive unit 224 for a recording medium 225, an auxiliary storage unit 226, and memory unit 227.

The input unit 222 includes a keyboard and a mouse, and is used to input various operation signals. The display unit 223 displays various windows and data necessary for the user to operate the count management server 20. The interface unit 221 is an interface for connecting the count management server 20 to connect to the network 2 and connect to other apparatuses, and for example, the interface unit 221 includes a NIC (Network Interface Card), a modem, a USB (Universal Serial Bus), and a like.

A program for operating the count management server 20 may be installed by the recording medium 225 such as a CD-ROM (Compact Disk Read Only Memory) or a like. Alternatively, the program may be downloaded through the network 2. The recording medium 225 is set to the drive unit 224, and the program and data are installed to the auxiliary storage unit 226 through the drive unit 224 from the recording medium 225.

The auxiliary storage unit 226 stores the data and the program, and also stores necessary files and a like. The memory unit 227 stores the program read from the auxiliary storage unit 226 when the count management server 20 is activated. The central processing unit 220 executes a process in accordance with the program read from the auxiliary storage unit 226 and stored in the memory unit 227.

Figure 5:
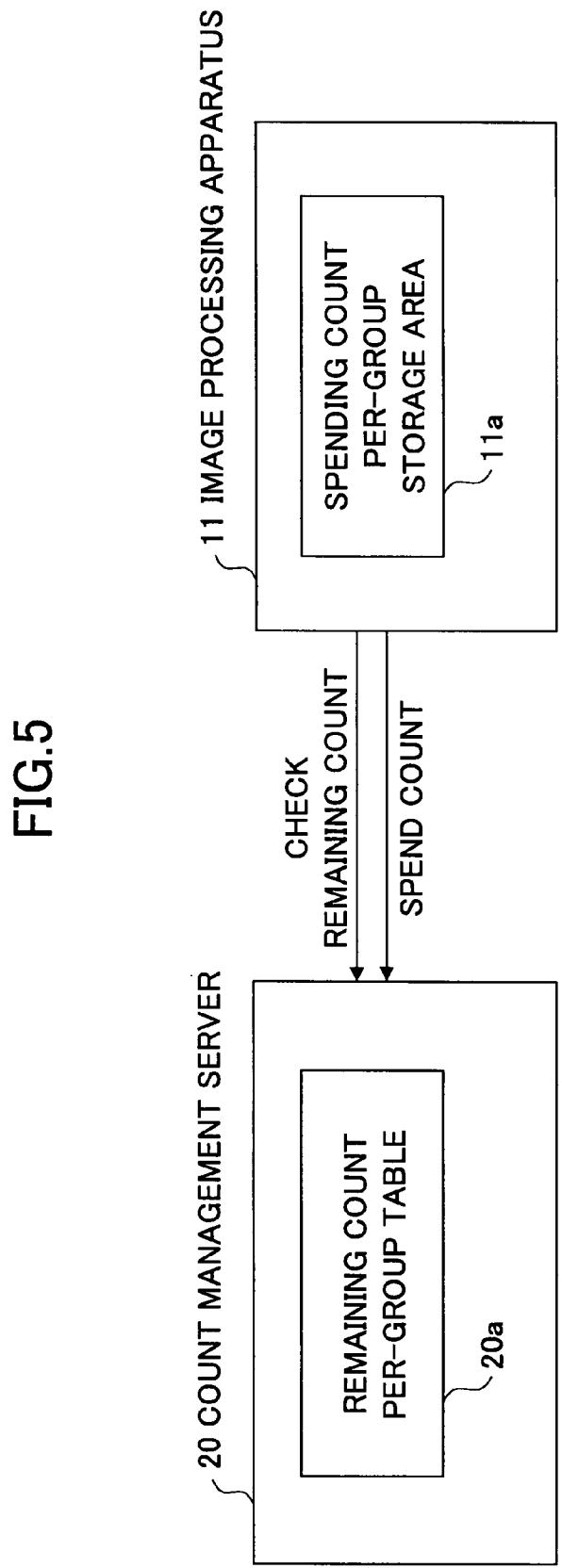
FIG. 5 is a diagram for briefly explaining a transaction of count information, according to the embodiment of the present invention.

FIG. 5 is a diagram for briefly explaining a transaction of count information, according to the embodiment of the present invention. In FIG. 5, the image processing apparatus 11 sends the group ID acquired from the user beforehand, in order to check a remaining count to the count management server 20 before performing a process.

The count management server 20 includes a remaining count per-group table 20a for managing a count available as a remaining count to users in the group specified by each group ID, and sends the image processing apparatus 11 the remaining count requested from the image processing apparatus 11 by referring to the remaining count per-group table 20a.

The image processing apparatus 11 acquires the remaining count corresponding to the group ID, stores the remaining count in a spending count storage per-group storage area 11a of the spending count maintenance part 203, and displays the remaining count at the operation panel 80. A user of the image processing apparatus 11 confirms the remaining count displayed at the operation panel of the image processing apparatus 11 beforehand, and determines whether or not the user can conduct a process.

When the user conduct a process request to the image processing apparatus 11 by using the operation panel 80, the image processing apparatus 11 conducts the process in response to the process request of the user, and sends a count corresponding to an executed process as a spending count (a count to be deducted) to the count management server 20.

The count management server 20 deducts the spending count received from the image processing apparatus 11 from the remaining count corresponding to the group ID of the remaining count per-group table 20a, and updates the remaining count in the remaining count per-group table 20a.

The transaction of the count information as described above is similarly conducted in the image processing apparatuses 12 and 13.

In the following, a case in which the user uses the image processing apparatus 11 will be described, and can be applied similarly to case in which the user uses any one of the image processing apparatuses 12 and 13.

Figure 6:
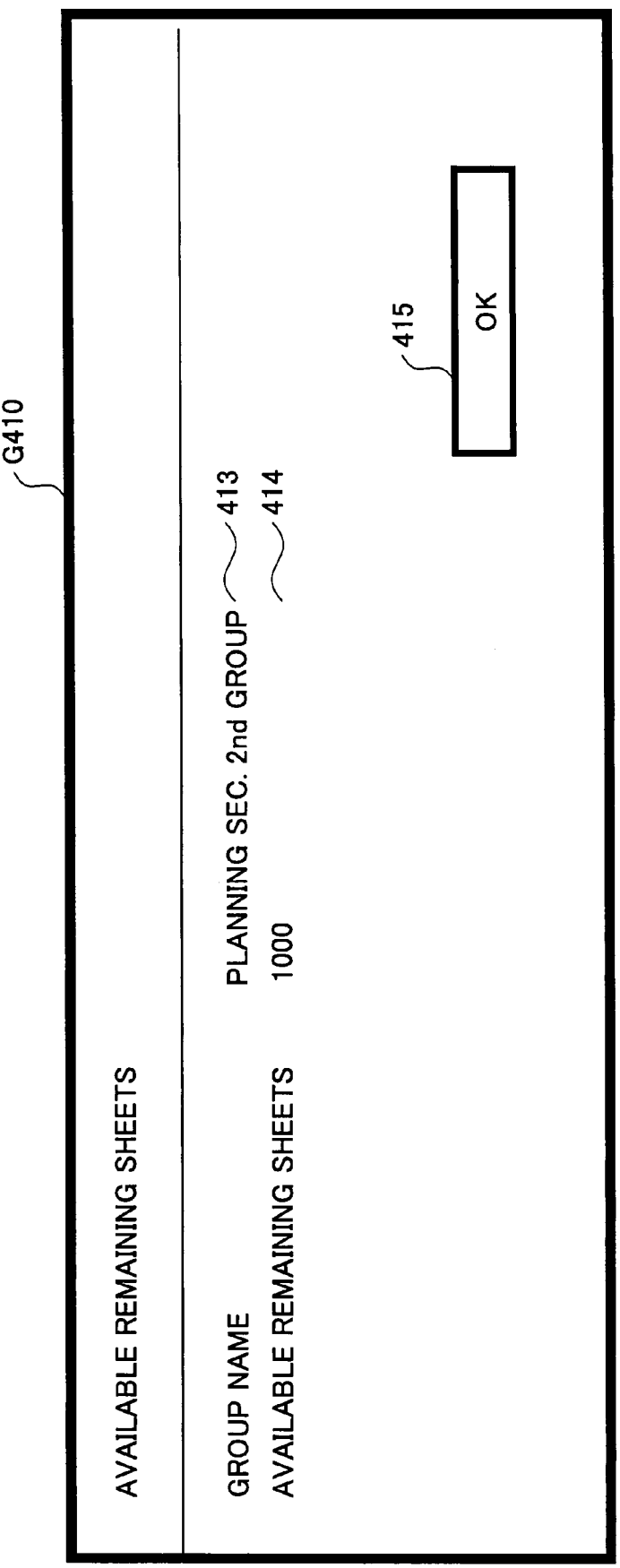
FIG. 6 is a diagram showing a screen for confirming a remaining count, according to the embodiment of the present invention.

First, a method for confirming the remaining count will be described with reference to FIG. 6 and FIG. 7. FIG. 6 is a diagram showing a screen for confirming the remaining count, according to the embodiment of the present invention. After the user logs in by inputting user authentication information from the operation panel 80 of the image processing apparatus 11 and authenticated by the user information server 30, when the user selects a confirmation of the remaining count, a screen G410 showing a count of remaining sheets which are available for use is displayed at the operation panel 80.

The screen G410 includes a display area 413 for displaying a group name of the group to which the user belongs, a display area 414 displaying the count of remaining sheets, and an OK button 415.

For example, after the user confirms "PLANING SEC. 2nd GROUP" displayed at the display area 413 and "1000" displayed at the display area 414, the user selects the OK button 415 and ends the confirmation of the remaining count.

Figure 7:
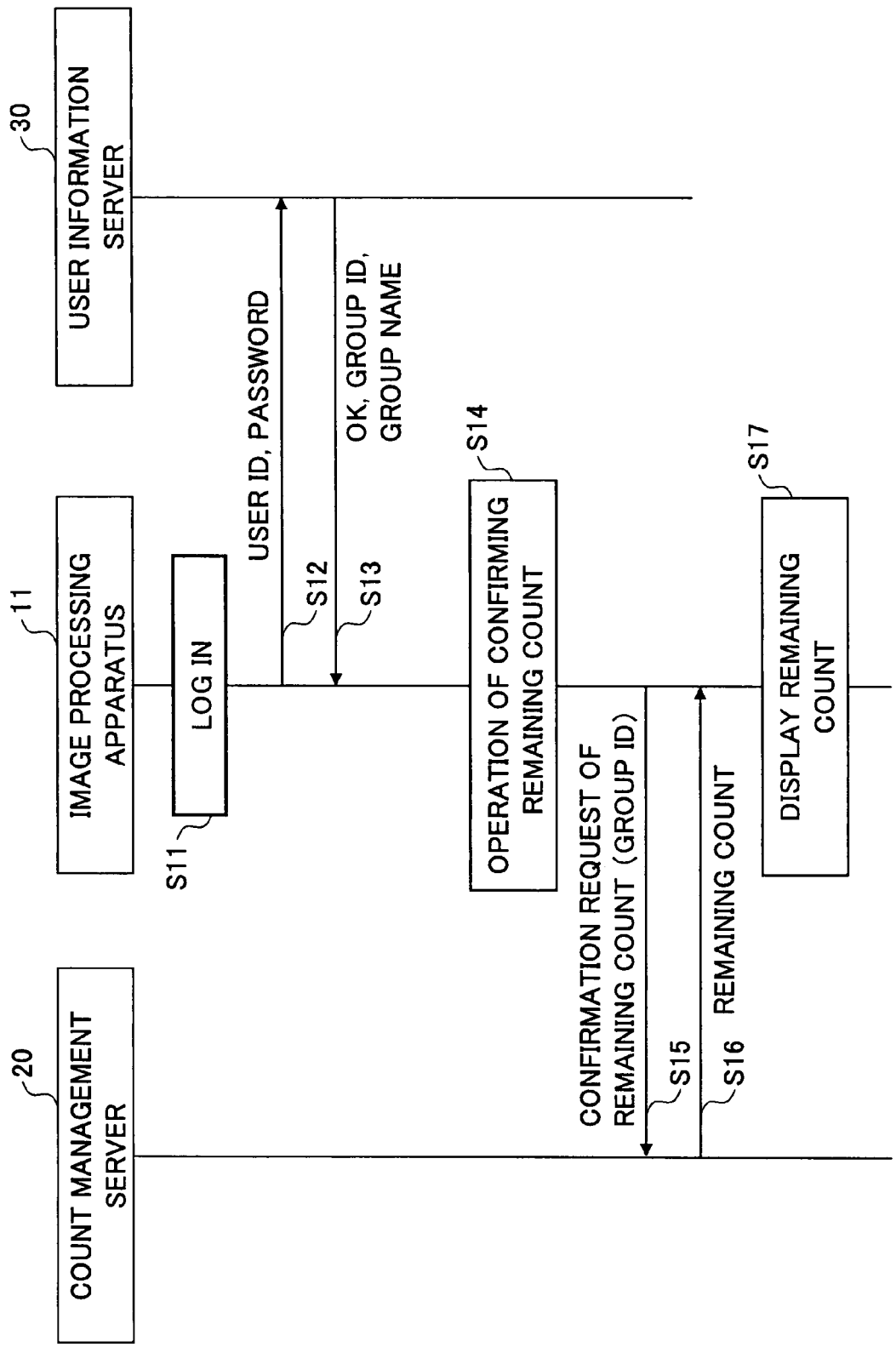
FIG. 7 is a diagram showing a process sequence for confirming the remaining count, according to the embodiment of the present invention.

FIG. 7 is a diagram showing a process sequence for confirming the remaining count, according to the embodiment of the present invention. In FIG. 7, when the image processing apparatus 11 displays a login screen at the operation panel 80 and the user inputs a user ID and a password (step S11), the image processing apparatus 11 sends the user authentication information including the user ID and the password to the user information server 30 (step S12).

The user information server 30 executes an authentication process by using the user ID and the password. When the authentication process is successful, the user information server 30 acquires the group ID and the group name of the group to which the user identified by the user ID belongs, from a storage area storing a correspondence of the group ID, the group name, and the user ID. Then, the user information server 30 sends information "OK" indicating a successful authentication, the group ID, and the group name to the image processing apparatus 11 (step S13). On the other hand, when the authentication process fails, only information indicating an authentication failure is sent to the image processing apparatus 11.

In a case in that the authentication fails, the image processing apparatus 11 displays the authentication failure at the operation panel 80 to inform the user, and does not accept the process request from the user. In a case in that the authentication is successful, when the user selects the confirmation of the remaining count from the operation panel 80 (step S14), the image processing apparatus 11 sends a confirmation request of the remaining count including the group ID to the count management server 20 (step S15).

The count management server 20 acquires the remaining count of the group ID received from the image processing apparatus 11 by referring to the remaining count per-group table 20a, and sends the remaining count of the group ID to the image processing apparatus 11 (step S16).

The image processing apparatus 11 stores the remaining count of the group ID received from the count management server 20 to the spending count maintenance part 103, and also displays the remaining count with the group ID received from the user information server 30 in a screen G410 shown in FIG. 6 at the operation panel 80 (step S17).

The image processing apparatus 11 cancels a job when the remaining count, which is acquired from the count management server 20 after the user login, indicates zero. On the other hand, when the remaining count is not zero, the image processing apparatus 11 has the user determine whether or not the user continues the process (job).

Figure 8:
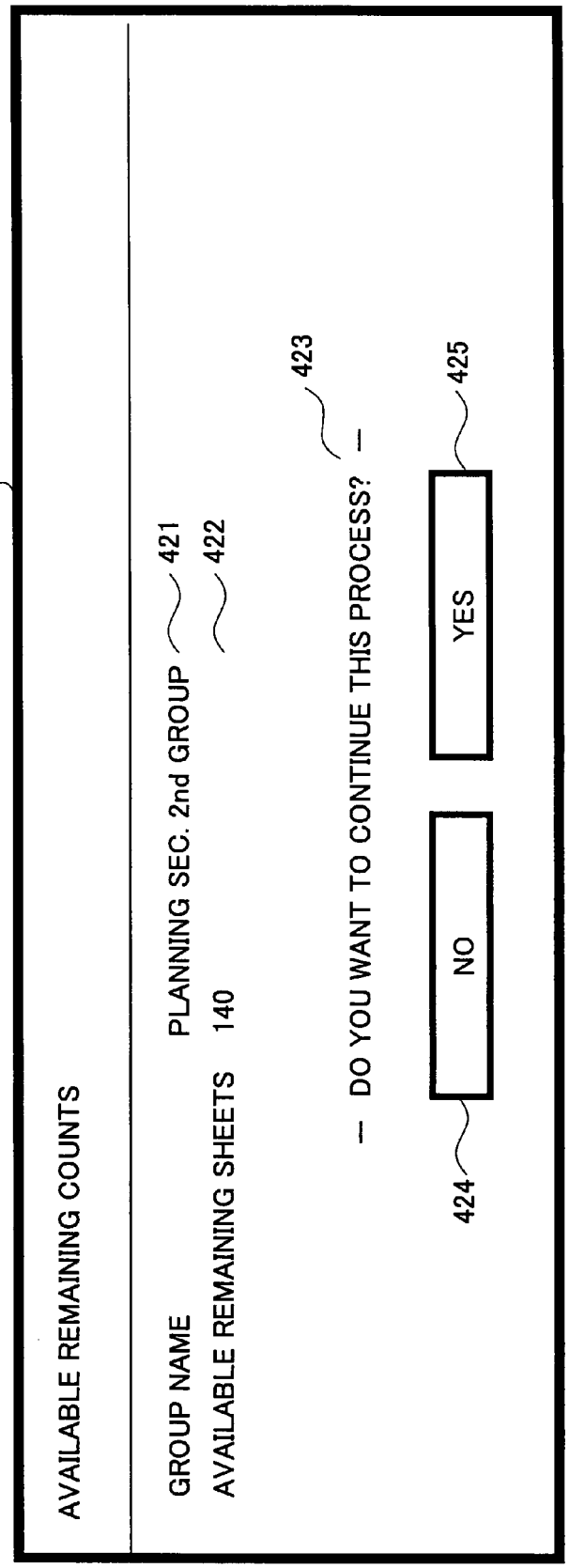
FIG. 8 is a diagram showing a screen for determining a continuation of a process based on the remaining count, according to the embodiment of the present invention.

A case of determining whether or not to continue the process based on the remaining count when starting the process (job operation start) selected by the user after the user logs in will be described with reference to FIG. 8 and FIG. 9. FIG. 8 is a diagram showing a screen for determining a continuation of the process based on the remaining count, according to the embodiment of the present invention. After the user logs in by inputting the user authentication information at the operation panel 80 of the image processing apparatus 11 and is authenticated by the user information server 30, the user operates the operation panel 80 to instruct the image processing apparatus 11 to conduct a desired process, a screen G420 for determining the continuation of the process is displayed at the operation panel 80.

The screen G420 includes a display area 421 for displaying the group name of the group to which the user belongs, a display area 422 for displaying the remaining count available to use, a display area 423 for displaying a message urging the user to determine the continuation of the process, a button 424 for canceling the process, and a button 425 for continuing the process.

For example, after the user confirms "PLANING SEC. 2nd GROUP" displayed at the display area 421 and "140" displayed at the display area 422, when the user does not continue the process (cancel), the user selects the button 424. In this case, the process (job) selected by the user is cancelled, and the operation panel 80 retunes to display a screen in a state before the job operation starts.

On the other hand, when the process is continued, the user selects the button 425. The image processing apparatus 11 executes the process (job) without a cancel when the user selects the continuation of the process (job) even if the remaining count is not sufficient.

When the remaining count is more than zero and the job is executed since the user confirms to continue the process, the image processing apparatus 11 sends a request of spending a count to the count management server 20 in order to deduct a count used for the job when the job ends. In this embodiment, a process sequence in this case is a basic sequence.

Figure 9:
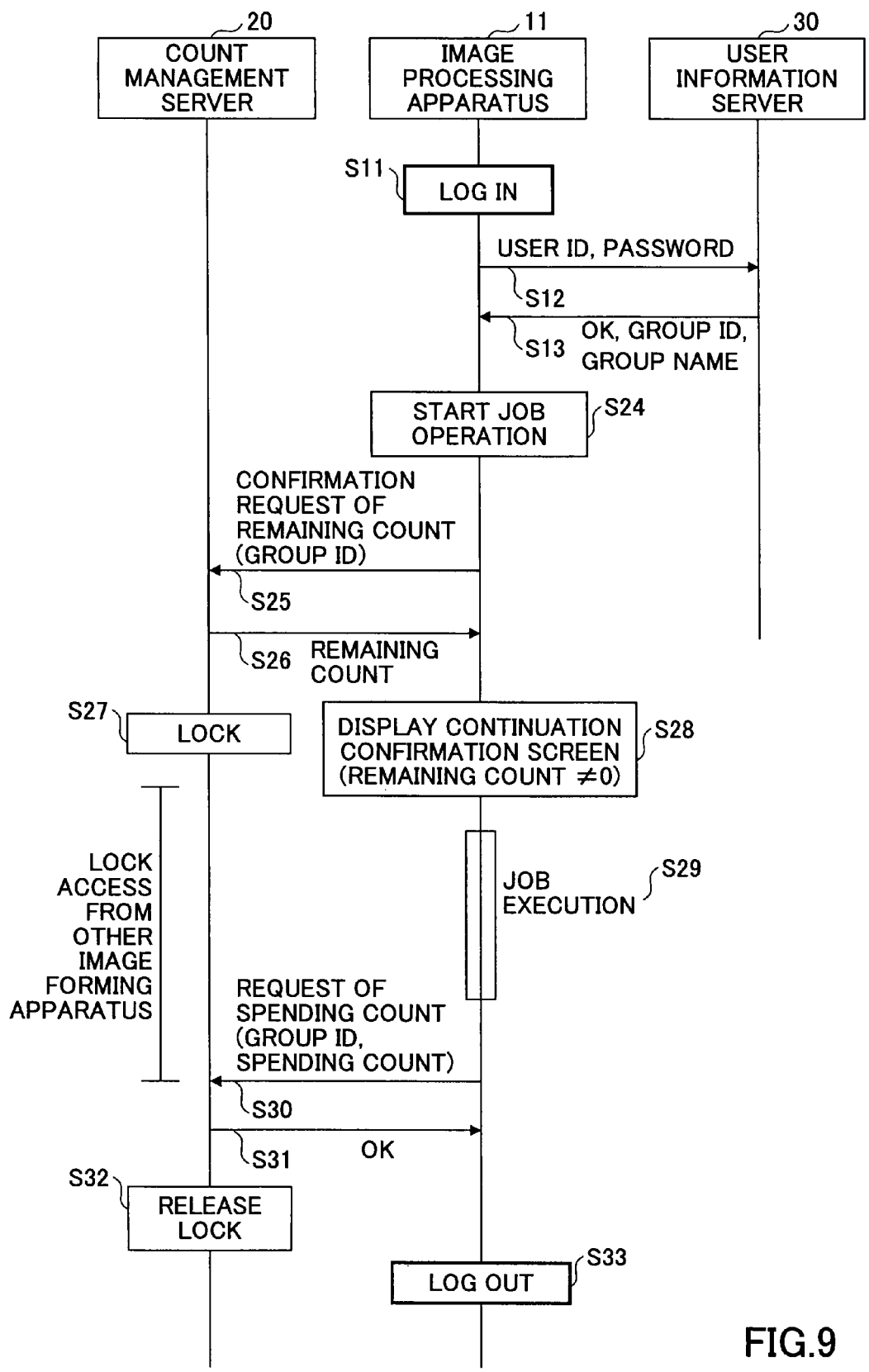
FIG. 9 is a diagram showing a process sequence in that the image processing apparatus conducts a request of spending count when a job ends, according to the embodiment of the present invention.

FIG. 9 is a diagram showing the process sequence in that the image processing apparatus 11 conducts the request of spending the count when the job ends, according to the embodiment of the present invention. In FIG. 9, steps that are the same as those shown in FIG. 7 are given the same reference numbers, and an explanation thereof will be omitted.

In FIG. 9, when the user authentication is successful, after the user selects a desired process from the operation panel 80 of the image processing apparatus 11 and conducts various settings necessary for the process, the user instructs starting the process (job operation start) (step S24). The image processing apparatus 11 sends the confirmation request of the remaining count including the group ID acquired in the step S13 to the count management server 20 (step S25).

The count management server 20 acquires the count corresponding to the group ID received from the image processing apparatus 11 by referring to the remaining count per-group table 20a, and sends the count as the remaining count to the image processing apparatus 11 (step S26).

Moreover, the count management server 20 becomes a locked state not to accept the confirmation request of the remaining count including the same group ID from any of the image processing apparatuses 12 and 13 (step S27). By transiting to be the locked state, it is possible to prevent an access illegally using the user authentication information of the user belonging to the group.

For example, when the count management server 20 receives the confirmation request of the remaining count in the step S25, the count management server 20 manages a correspondence table of the group ID and an address of the image processing apparatus 1 (for example, IP address) as the image processing apparatus 11 is in a process of spending the remaining count, and controls not to accept the confirmation request of the remaining count including the same group ID from any of the image processing apparatuses 12 and 13.

The count management server 20 adds a record indicating the group ID included in the confirmation request of the remaining count and the address of the image processing apparatus 11 to the correspondence table, and receives the confirmation request of the remaining count including the same group ID from any of the image processing apparatuses 12 and 13. When a record of the group ID exists in the correspondence table, instead of sending the remaining count, information indicating "unavailable" is sent to the image processing apparatuses 12 or 13 which is a confirmation request originator.

When the image processing apparatus 11 receives the remaining count, if the remaining count is more than zero, the image processing apparatus 11 displays a screen G420 as shown in FIG. 8 at the operation panel 80, and has the user confirm the count (corresponding to available sheets), so that the user determines whether or not to continue the job (desired process) (step S28).

When the user selects the continuation of the job, the image processing apparatus 11 executes the job (step S29) The image processing apparatus 11 calculates the count spent by the server communication part 102 while executing the job.

On the other hand, when the user cancels the job, the image processing apparatus 11 displays a screen subsequent to the login at the operation panel 80, sets zero to the spending count, and conducts step S30.

When the job ends, the image processing apparatus 11 sends a request of spending the count including the group ID and a spending count (step S30).

The count management server 20 sends the image processing apparatus 11 information "OK" indicating that the request of spending the count is accepted, and updates the remaining count per-group table 20a by deducting the spending count indicated in the request of spending the count from the remaining count which corresponds to the group ID indicated in the request of spending the count and stored in the remaining count pre-group table 20a (step S31).

Moreover, the count management server 20 releases the locked state set in the step S27 (step S32). For example, the count management server 20 deletes the record of the group ID indicated in the request of spending the count from the correspondence table of the group ID and the address (for example, IP address) of the image processing apparatus 11.

The image processing apparatus 11 receives information. "OK" indicating that the process for the request of spending the count is completed, from the count management server 20 and logs out (step S33).

Figure 10:
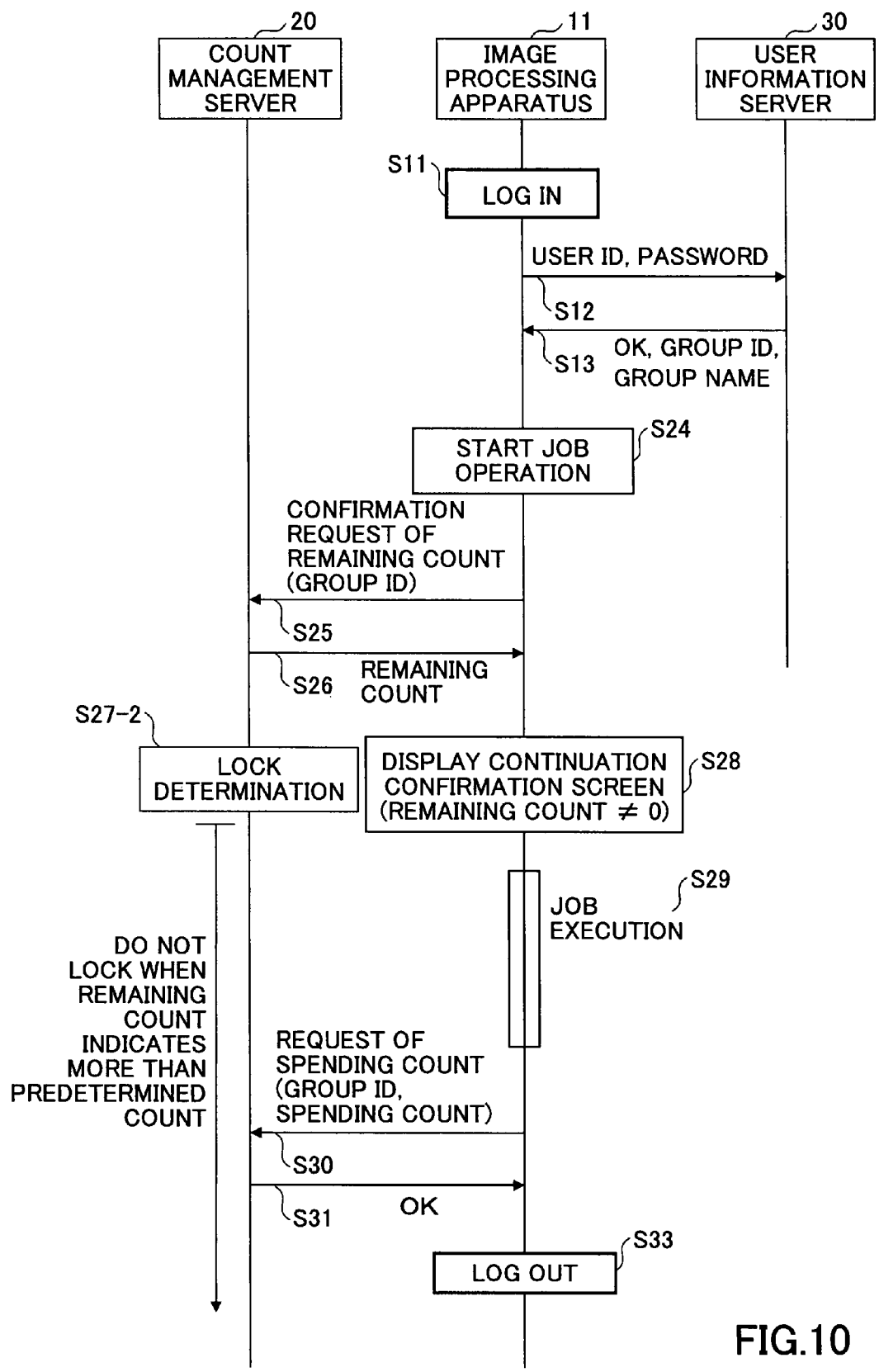
FIG. 10 is a diagram showing a process sequence in a case in that the remaining count is equal to or more than a predetermined count, according to the present invention.

A case in which the count management server 20 does not transit to the locked state if the remaining count is equal to or more than a predetermined count in the step S27 in FIG. 9 will be described with reference to FIG. 10. FIG. 10 is a diagram showing a process sequence in the case in that the remaining count is equal to or more than the predetermined count, according to the present invention. In FIG. 10, steps that are the same as those shown in FIG. 7 and FIG. 9 are given the same reference numbers, and an explanation thereof will be omitted.

In FIG. 10, after the count management server 20 sends the remaining count in response to the confirmation request of the remaining count from the image processing apparatus 11 (steps S25 and S26), the count management server 20 determines whether or not to transit to the locked state by comparing the remaining count and a predetermined count (lock determination) (step S27-2).

When the remaining count is equal to or more than the predetermined count, the count management server 20 does not transit to the locked state, and accepts the confirmation request of the remaining count including the same group ID from any of the image processing apparatuses 12 and 13, and sends the remaining count to the image processing apparatuses 12 or 13 which is a request originator.

On the other hand, when the remaining count is less than the predetermined count, the count management server 20 conducts the same process in the step S27 in FIG. 9, and transits to the locked state which does not accept the confirmation request of the remaining count including the same group ID from any of the image processing apparatuses 12 and 13.

Next, in a case of transiting to the locked state after the confirmation request of the remaining count from the image processing apparatus 11, if an execution time of the job is longer, other jobs of the image processing apparatuses 12 and 13 cannot be executed for a long time. In order to avoid this problem, the image processing apparatus 11 frequently sends the spending count to the count management server 20 at a predetermined timing, and the count management server 20 updates the remaining count per-group table 20a, so that it is not required to transit to the locked state.

Figure 11:
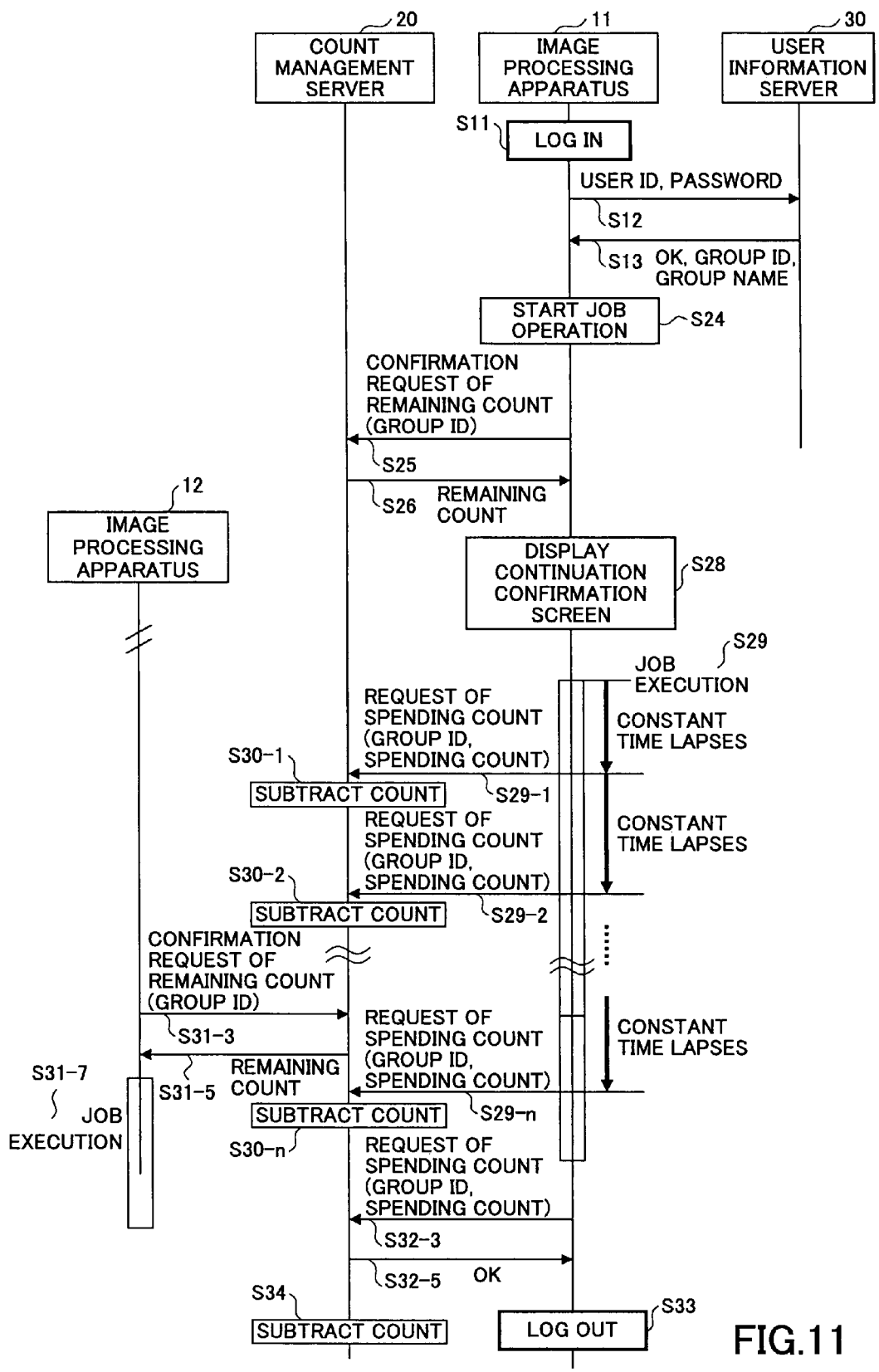
FIG. 11 is a diagram showing a process sequence for informing a spending count every time a constant time lapses, according to the embodiment of the present invention.

Process sequences for informing the spending count to the count management server 20 at the predetermined timing will be described with reference to FIG. 11 and FIG. 12. FIG. 11 is a diagram showing a process sequence for informing the spending count every time a constant time lapses, according to the embodiment of the present invention. In FIG. 11, step that are the same as those shown in previously described figures are given the same reference numbers, and an explanation thereof will be omitted.

In FIG. 11, when the image processing apparatus 11 receives the remaining count after sending the confirmation request of the remaining count (steps S25 and S26), in a case in which the remaining count is more than zero, the image processing apparatus 11 displays the screen G420 as shown in FIG. 8 at the operation panel 80, and has the user confirm the count (of sheets) and determine the continuation of the job (process) (step S28).

When the user selects to continue the job, the image processing apparatus 11 executes the job (step S29).

The server communication management part 102 of the image processing apparatus 11 calculates the count which is spent, while the job is being executed. Also, the image processing apparatus 11 calculates the count as the spending count when the constant time lapses from an execution of the job, and sends the request of spending the count including the group ID and the spending count (step S29-1). The image processing apparatus 11 resets the spending count and restarts to count the spending count.

The count management server 20 deducts the spending count indicated in the request of spending the count from the remaining count corresponding to the group ID which is indicated in the request of spending the count and is stored in the remaining count per-group table 20a, and updates the remaining count per-group table 20a (step S30-1).

When the constant time lapses after the step S29-1, the image processing apparatus 11 sets the count being calculated as the spending count and sends the request of spending the count including the group ID and the spending count (step S29-2). Then, the image processing apparatus 11 resets the count to be calculated and restarts calculating the count as the spending count.

The count management server 20 deducts the spending count indicated in the request of spending the count from the remaining count which corresponds to the group ID and is stored in the remaining count per-group table 20a, and updates the remaining count per-group table 20a.

As described above, since the image processing apparatus 11 sends the spending count to the count management server 20 every time the constant time lapses while executing the job, the count management server 20 manages the latest remaining count without being affected by the length of the execution time of the job. Accordingly, instead of transiting to the locked state, the count management server 20 can respond to the confirmation request of the remaining count including the same group ID from the image processing apparatuses 12 and 13 other than the image processing apparatus 11.

When the image processing apparatus 12 sends the confirmation request of the remaining count including the same group ID to the count management server 20 (step S31-3), the count management server 20 sends the remaining count to the image processing apparatus 12 even if the remaining count of the same group ID of the image processing apparatus 11 is being spent (step S31-5).

When the image processing apparatus 12 receives the remaining count from the count management server 20, after displaying a continuation confirmation screen, the image processing apparatus 12 executes a job in response to a selection of a user (step S31-7). After that, the image processing apparatus 12 conducts a process similarly to the image processing apparatus 11.

On the other hand, the image processing apparatus 11 sends the request of spending the count including the group ID and the spending count to the count management server 20 every time the constant time lapses during the job execution (step S29-n). The count management server 20 deducts the spending count indicated in the request of spending the count from the remaining count which corresponds to the group ID included in the request of spending the count and is stored in the remaining count per-group table 20a, and updates the remaining count per-group table 20a (step S30-n).

Moreover, when the job ends, the image processing apparatus 11 sets the count, which is reset and restarted after the step S29-n, as the spending count, and sends the request of spending the count including the group ID and the spending count to the count management server 20 (step S32-3) The image processing apparatus 11 receives the information "OK" indicating an acceptance of the request of spending the count, from the count management server 20, and logs out (step S33).

The count management server 20 deducts the spending count indicated in the request of spending the count from the remaining count which corresponds to the group ID indicated in the request of spending the count and is stored in the remaining count per-group table 20a, and updates the remaining count per-group table 20a (step S34).

In the step S26 in the process sequence shown in FIG. 11, it is possible for the count management server 20 to send the image processing apparatus 11 information of the constant time indicating a timing to inform the spending count with the remaining count. The image processing apparatus 11 maintains the constant time indicated in the information received in the step S26 by using the server communication management part 102, and informs the spending count to the count management server 20 every time the constant time lapses.

Figure 12:
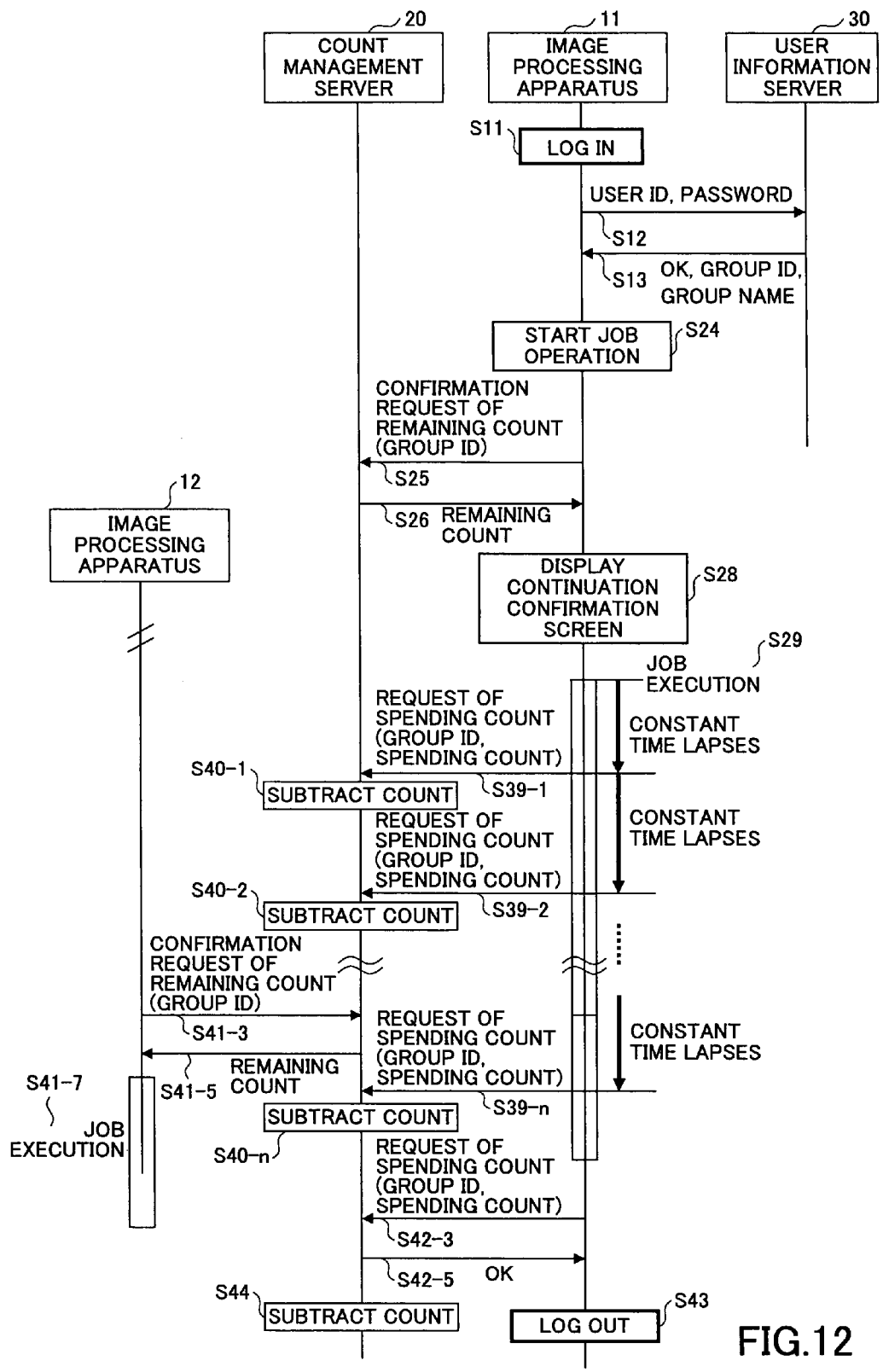
FIG. 12 is a diagram showing a process sequence for informing the spending count every time a constant count is spent, according to the embodiment of the present invention.

FIG. 12 is a diagram showing a process sequence for informing the spending count every time a constant count is spent, according to the embodiment of the present invention. In FIG. 12, steps that are the same as those shown in the previous described figures are given the same reference numbers, and an explanation thereof will be omitted.

In FIG. 12, when the image processing apparatus 11 receives the remaining count after sending the confirmation request of the remaining count (steps S25 and S26), if the remaining count is more than zero, the image processing apparatus 11 displays the screen G420 as shown in FIG. 8 at the operation panel 80, and has the user confirm the count (corresponding to available sheets), so that the user determines whether or not to continue the job (desired process) (step S28).

When the user selects the continuation of the job, the image processing apparatus 11 executes the job (step S29).

The image processing apparatus 11 counts the spending count by the server communication management part 102 while executing the job. When the constant count is spent during the job execution, the image processing apparatus 11 sends the request of spending the count including the group ID and the spending count to the count management server 20 (step S39-1). Then, the image processing apparatus 11 resets and restarts to count the spending out.

The count management server 20 updates the remaining count table 20a by deducting the spending count indicated in the request of spending the count from the remaining count which corresponds to the group ID and is stored in the remaining count per-group table 20a (step S40-1).

When a further constant count is spent after the step S39-1, the image processing apparatus 11 sends the request of spending the count including the group ID and the spending count (step S39-2), and resets and restarts to count the spending count.

The count management server 20 updates the remaining count per-group table 20a by deducting the spending count indicated in the request of spending the count from the remaining count which corresponds to the group ID indicated the request of spending the count and is stored in the remaining count per-group table 20a (step S40-2).

As described above, since the image processing apparatus 11 sends the spending count to the count management server 20 every time the constant time lapses while executing the job, the count management server 20 manages the latest remaining count without being affected by the length of the execution time of the job. Accordingly, instead of transiting to the locked state, the count management server 20 can respond to the confirmation request of the remaining count including the same group ID from the image processing apparatuses 12 and 13 other than the image processing apparatus 11.

When the image processing apparatus 12 sends the confirmation request of the remaining count including the same group ID to the count management server 20 (step S41-3), the count management server 20 sends the remaining count to the image processing apparatus 12 even if the remaining count corresponding to the same group ID is being spent for the image processing apparatus 11 (step S41-5).

When the image processing apparatus 12 receives the remaining count from the count management server 20, the image processing apparatus 12 executes a job in response to a selection of the user after displaying the continuation confirmation screen (step S41-7). After that, the image processing apparatus 12 conducts a process similarly to the image processing apparatus 11.

On the other hand, the image processing apparatus 11 sends the request of spending the count including the group ID and the spending count every time the constant count is spent during the job execution (step S39-n). The count management server 20 updates the remaining count per-group table 20a by deducting the spending count indicated in the request of sending the count from the remaining count which corresponds to the group ID indicated in the request of spending the count and is stored in the remaining count per-group table 20a (step S30-n).

Moreover, when the job ends, the image processing apparatus 11 sends the request of spending the count including the group ID and the spending count, which is reset and restarted to count after the step S39-n, to the count management server 20 (step S42-3). The count management server 20 receives information "OK" indicating an acceptance of the request of spending the count from the count management server 20 (step S42-5), and logs out (step S43).

The count management server 20 updates the remaining count per-group table 20a by deducting the spending count indicated in the request of spending the count from the remaining count which corresponds to the group ID indicated in the request of spending the count and is stored in the remaining count per-group table 20a (step S44).

In the step S26 in the process sequence shown in FIG. 12, the count management server 20 may send information of the constant count for a timing to inform the spending count with the remaining count to the image forming apparatus 11. The image processing apparatus 11 maintains the information of the constant time received in the step S26 by using the server communication management part 102, and informs the spending count to the count management server 20 every time the constant count is spent.

Figure 13:
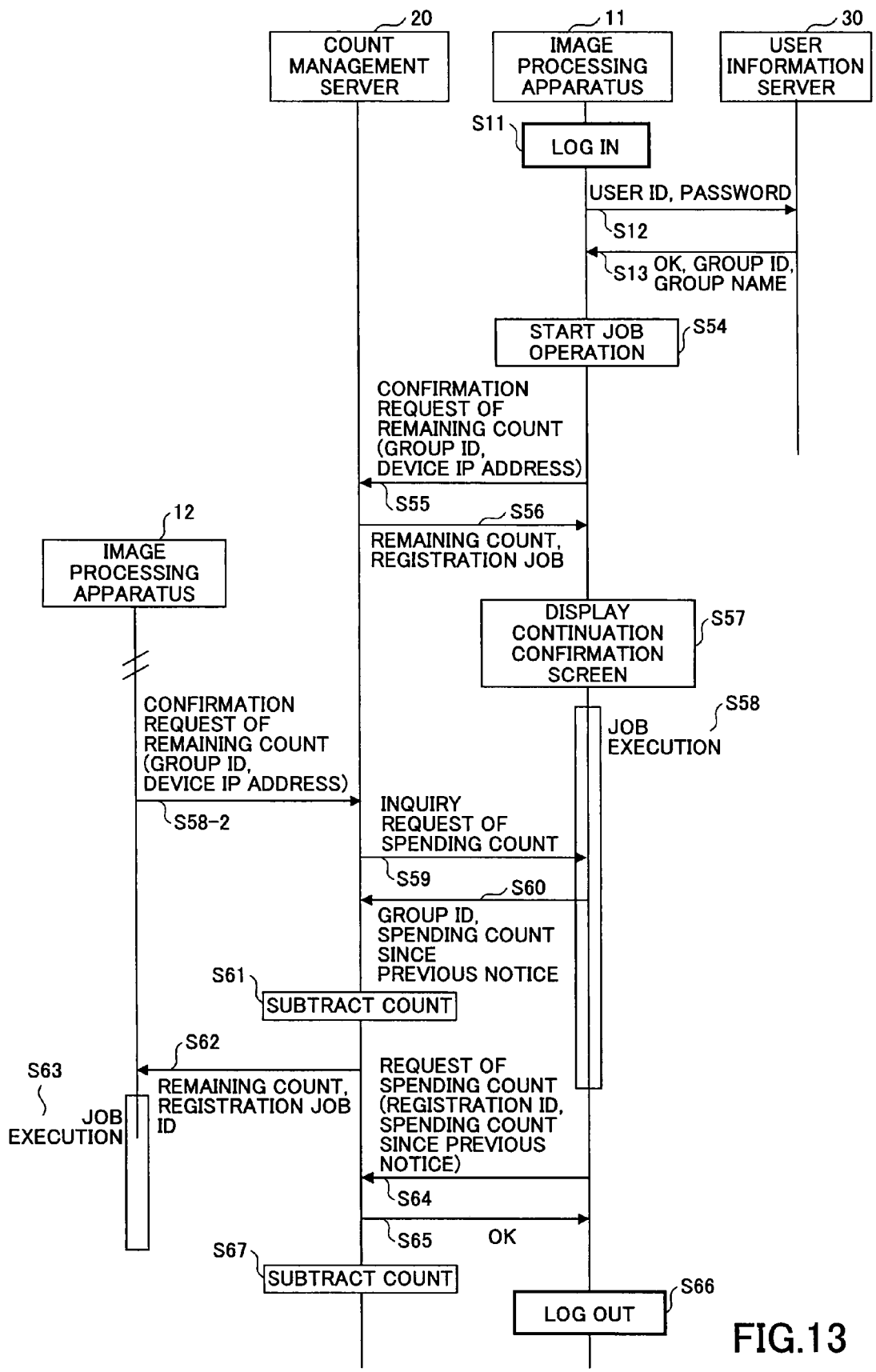
FIG. 13 is a diagram showing a process sequence for the count management server to inquire about the spending count, according to the embodiment of the present invention.

Next, a process sequence, in which the count management server 20 inquires about the spending count to the image processing apparatus 11 when the count management server 20 receives the confirmation request of the remaining count from any of the image processing apparatuses 12 and 13 while the image processing apparatus 11 is executing the job, will be described with reference to FIG. 13. FIG. 13 is a diagram showing the process sequence for the count management server 20 to inquire about the spending count, according to the embodiment of the present invention.

In FIG. 13, when the user authentication is successful, after the user selects a desired process and conducts various settings necessary for the desired process at the operation panel 80 of the image processing apparatus 11, the user instructs a start of the desired process (job operation start) (step S54). The image processing apparatus 11 sends the confirmation request of the remaining count including group ID acquired in the step S13 and an IP address identifying the image processing apparatus 11 itself, to the count management server 20 (step S55).

The count management server 20 generates a registration job ID for identifying a combination of the group ID and the IP address. Moreover, the count management server 20 adds and registers the registration job ID, the group ID, and the IP address to a registration job table 20b as shown in FIG. 14, which will be described later. Then, the count management server 20 acquires the remaining count corresponding to the group ID received from the image processing apparatus 11 by referring to the remaining count per-group table 20a, and sends the remaining count with the registration ID to the image processing apparatus 11 (step S56).

When the image processing apparatus 11 receives the remaining count and the registration job ID, if the remaining count is more than zero, the image processing apparatus 11 displays the screen G420 as shown in FIG. 8 at the operation panel 80, and has the user confirm the count (of available sheets) and determine the continuation of the job (process) (step S57). Moreover, the image processing apparatus 11 manages the registration job ID by using the server communication management part 102.

When the user selects the continuation of the job, the image processing apparatus 11 executes the job (step S58) While the image processing apparatus 11 executes the job, the server communication management part 102 counts the spending count. On the other hand, when the user cancels the job, the image processing apparatus 11 displays a screen subsequent to the login at the operation panel 80.

On the other hand, when the count management server 20 receives the confirmation request of the remaining count including the same group ID and the IP address identifying the image processing apparatus 12 from the image processing apparatus 12 (step S58-2), the count management server 20 retrieves a record indicating the same group ID from the registration job table 20b, and sends an inquiry request of the remaining count including the registration job ID of the retrieved record with respect to the IP address indicated in the retrieved record (step S59).

Moreover, the count management server 20 generates the registration job ID for identifying the job of the image processing apparatus 12, and adds and registers the registration job ID, the group ID, and the IP address of the image processing apparatus 12 to the registration job table 20b.

In FIG. 13, the inquiry request of the spending count is sent to the image processing apparatus 11. For example, if a job of the image processing apparatus 13 has been already registered in the registration job table 20b, similarly, the inquiry request of the spending count is sent to the image processing apparatus 13.

The image processing apparatus 11 confirms that the registration job ID indicated in the inquiry request of the spending count is the registration job ID received in the step S56, and sends the spending count counted by the server communication management part 102 with the group ID to the count management server 20 (step S60). Then, the image processing apparatus 11 resets and restarts counting the spending count.

The count management server 20 updates the remaining count per-group table 20a by deducting the spending count indicated in the request of spending the count from the remaining count which corresponds to the group ID and is stored in the remaining count per-group table 20a (step S61). The count management server 20 sends the remaining count updated in the step S61 with the registration job ID of the image processing apparatus 12, to the image processing apparatus 12 (step S62).

When the image processing apparatus 12 receives the remaining count from the count management server 20, similar to the image processing apparatus 11, the image processing apparatus 12 executes a job in response to a selection of the user after displaying the continuation confirmation screen (step S63). After that, the image processing apparatus 12 conducts a process similar to the image processing apparatus 11.

On the other hand, when the job of the image processing apparatus 11 ends, the image processing apparatus 11 sends the request of spending the count including the registration job ID and the spending count, which is reset and restarted to be counted after the step S59, to the count management server 20 (step S64). After that, the image processing apparatus 11 receives information "OK" indicating an acceptance of the request of spending the count from the count management server 20 (step S65), and logs out (step S66).

The count management server 20 updates the remaining count per-group table 20a by deducting the spending count indicated in the request of spending the count from the remaining count which corresponds to the group ID indicated in the request of spending the count and is stored in the remaining count per-group table 20a (step S67). When the request of spending the count is received from the image processing apparatus 13, the count management server 20 updates the remaining count per-group table 20a by further deducting the spending count of the image processing apparatus 13.

Also, the count management server 20 deletes the record including the registration job ID indicated in the request of spending the count from the registration job table 20b.

In the process sequence shown in FIG. 13, it is possible for the image processing apparatus 11 to reduce a process workload related to informing the spending count to the count management server 20. Moreover, it is possible for the count management server 20 to reduce a process related to the spending count informed at a predetermined intervals from each of the image processing apparatuses 11 through 13.

FIG. 14 is a diagram showing the registration job table 20b according to the embodiment of the present invention. In FIG. 14, the registration job table 20b includes items of the registration job ID, the group ID, the IP, and the like, and is stored and maintained in a storage area of the count management server 20.

In the registration job table 20b, only information concerning the job being currently processed is maintained. When the request of spending the count is received from the image processing apparatuses 11 through 13, it is determined that a respective job ends. Thus, a record including the registration job ID corresponding to the respective job is deleted from the registration job table 20b.

In the above-described embodiment, the count of sheets is applied as the remaining count and the spending count but a residual amount of money may be applied.

Moreover, in the embodiment, when each of the image processing apparatuses 11 through 13 receives the remaining count from the count management server 20 before the job starts, if the remaining count is more than zero, the job is executed. Alternatively, the job may be executed if the remaining count is equal to or more than a threshold. In addition, a threshold corresponding to a type of a process selected by the user may be set for the remaining count.

As described above, according to the present invention, in a case of managing a plurality of users as members in each group and giving a count to use a predetermined process of an image processing apparatus for each group, even if more than two users in the same group request the predetermined process at different image processing apparatuses, it is possible to timely manage the count and it is possible for the plurality of users in the same group to execute the predetermined process.

The present invention is not limited to the specifically disclosed embodiments, and variations and modifications may be made without departing from the scope of the present invention.

The present application is based on the Japanese Priority Application No. 2006-135339 filed May 15, 2006, the entire contents of which are hereby incorporated by reference.

What is claimed is:

1. An image processing apparatus for executing a process based on a count available for each group, comprising:
   a remaining count acquisition part to acquire a remaining count available for a group to which a user authenticated by a user ID belongs, from a count management server which manages the count for each group;
   a start acceptance part to accept a start of a job authentication by the authenticated user,
   wherein the remaining count acquisition part acquires the remaining count from the count management server before the job starts; and
   a selection screen display part to display a screen which shows a group name of the group and the remaining count acquired by the remaining count acquisition part and allows the authenticated user to select whether or not to continue the job indicated by the authenticated user.

2. The image processing apparatus as claimed in claim 1, wherein the remaining count acquisition part acquires the remaining count from the count management server by sending the count management server a group ID identifying the group to which the authenticated user belongs.

3. The image processing apparatus as claimed in claim 1, further comprising:
   a confirmation operation acceptance part to accept a confirmation operation of the remaining count by the authenticated user; and
   a remaining count display part to display a group name of the group and the remaining count acquired by the remaining count acquisition part at an operation part.

4. The image processing apparatus as claimed in claim 1, further comprising:
   a job execution part to execute a job indicated by the user if the remaining count acquired from the remaining count acquisition part is more than threshold.

5. The image processing apparatus as claimed in claim 1, further comprising:
    a first deduction part to send the count management server a request to deduct a spending count used while the job is being executed, from the remaining count of the group when the job ends.

6. The image processing apparatus as claimed in claim 1, further comprising:
    a second deduction part to send the count management server a request to deduct a spending count used while the job is being executed every predetermined timing, and resetting the spending count.

7. The image processing apparatus as claimed in claim 6, wherein the predetermined timing is a predetermined time interval.

8. The image processing apparatus as claimed in claim 6, wherein the predetermined timing is a time when the spending count reaches a predetermined count.

9. The image processing apparatus as claimed in claim 6, wherein the predetermined timing is informed from the count management server.

10. The image processing apparatus as claimed in claim 1, further comprising:
    a spending count sending part to send the count management server the spending count in response to an inquiry of the spending count from the count management server while the job is being executed, and to reset the spending count.

11. The image processing apparatus as claimed in claim 4, wherein the threshold is set for each type of the job.

12. A count management server for managing a count for a user to use an image processing apparatus for each group, comprising:
    a remaining count sending part to send a remaining count in response to a confirmation request of the remaining count available in a group to which a user belongs, from the image processing apparatus;
    a first deduction part to deduct a spending count from the remaining count available in the group in response to a request of deducting the count used while a job is being executed, the request sent from the image processing apparatus when the job ends;
    a locked state setting part to set a locked state with respect to the group so as not to accept an access by the same group from another image processing apparatus after the remaining count sending part sends the remaining count; and
    a locked state release part to release the locked state with respect to the group after the first deduction part deduces the spending count from the remaining count available for the group.

13. The count management server as claimed in claim 12, wherein the locked state setting part sets the locked state with respect to the group when the remaining count is equal to or more than a predetermined count.

14. The count management server as claimed in claim 12, further comprising:
    a second deduction part to deduct the spending count from the remaining count available in the group in response to a request of deducting the spending count while the job is being executed, the request sent from the image processing apparatus every predetermined timings.

15. The count management server as claimed in claim 12, further comprising:
    a remaining count inquiry part to inquire about the spending count at present with respect to the image processing apparatus so as to acquire the spending count from the image processing apparatus and to deduct the spending count from the remaining count available in the group, in response to a confirmation request of the remaining count available in a same group from another image processing apparatus.

16. A count management method performed in a count management server for managing a count for a user to use an image processing apparatus for each group, comprising the steps of:
    sending a remaining count in response to a confirmation request of the remaining count available in a group to which an authenticated user belongs, from the image processing apparatus;
    deducting a spending count from the remaining count available in the group in response to a request of deducting the count used while a job is being executed, the request sent from the image processing apparatus when the job ends;
    accepting, by a start acceptance part, a start of a job operation by the authenticated user, wherein the remaining count acquisition part acquires the remaining count from the count management server before the job starts; and
    displaying, by a selection screen display part, a screen which shows a group name of the group and the remaining count acquired by the remaining count acquisition part wherein the selection screen display part allows the authenticated user to select whether or not to continue the job indicated by the authenticated user.

* * * * *